(12) United States Patent
Naim et al.

(10) Patent No.: US 10,383,124 B1
(45) Date of Patent: *Aug. 13, 2019

(54) METHOD TO TRANSMIT DATA PACKETS ON A NETWORK

(71) Applicant: Sprint Communications Company L.P., Overland Park, KS (US)

(72) Inventors: Muhammad Ahsan Naim, Sterling, VA (US); Yu Zhou, Herndon, VA (US); David Rosen, Washington, DC (US); Luca Zappaterra, Arlington, VA (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 15/875,774

(22) Filed: Jan. 19, 2018

Related U.S. Application Data

(63) Continuation of application No. 14/720,365, filed on May 22, 2015, now Pat. No. 9,924,516.

(51) Int. Cl.
*H04W 72/04* (2009.01)
*H04W 28/02* (2009.01)
*H04W 28/16* (2009.01)

(52) U.S. Cl.
CPC ... *H04W 72/0453* (2013.01); *H04W 28/0268* (2013.01); *H04W 28/16* (2013.01)

(58) Field of Classification Search
None
See application file for complete search history.

(56) References Cited

U.S. PATENT DOCUMENTS

| | | |
|---|---|---|
| 7,106,715 B1 | 9/2006 | Kelton et al. |
| 9,924,516 B1 * | 3/2018 | Naim ............... H04W 28/0268 |
| 2003/0073411 A1 | 4/2003 | Meade, II |
| 2007/0002740 A1 | 1/2007 | Evans et al. |

* cited by examiner

*Primary Examiner* — Willie J Daniel, Jr.

(57) ABSTRACT

A method and system for assigning data packet transmission in a wireless communications network is provided. The method comprises receiving first and second user data packets having respective first and second packet sizes, one of the packet sizes being larger than the other, determining an uplink/downlink ratio based on network statistics, and assigning the first and second data packets to respective first and second signal carrier spectrums each having a different time interval between uplink transmissions with the network. A system is also provided comprising a network controller configured to receive data packets and assign individual data packets to one of a first and a second signal carrier spectrum based on the size of the data packets, the first and the second signal carrier spectrums having the same uplink/downlink ratio and different uplink intervals.

20 Claims, 4 Drawing Sheets

METHOD TO TRANSMIT DATA PACKETS ON A NETWORK

CROSS-REFERENCE TO RELATED APPLICATIONS AND PRIORITY CLAIM

This application is a continuation application that claims priority to co-pending U.S. patent application Ser. No. 14/720,365, filed May 22, 2015, titled "Method to Transmit Data Packets on a Network," the entire contents of which is incorporated herein by reference.

SUMMARY

A high level overview of various aspects of the invention is provided here for that reason, to provide an overview of the disclosure, and to introduce a selection of concepts that are further described in the detailed-description section. This summary is not intended to identify key features or essential features of the claimed subject matter, nor is it intended to be used as an aid in isolation to determine the scope of the claimed subject matter. The scope of the invention is defined by the claims.

In brief, and at a high level, this disclosure describes, among other things, a method and system for assigning data packets for transmission in a wireless communication network. In a first aspect, a method for assigning data packet transmission in a wireless communications network is provided. The method comprises receiving a first user data packet identified with a first packet size, receiving a second user data packet identified with a second packet size, wherein the second data packet size is larger than the first data packet size, determining a network uplink/downlink ratio based on network statistics, assigning the first user data packet to a first signal carrier spectrum having a first time interval between uplink transmissions with the network, the first signal carrier spectrum having the determined uplink/downlink ratio, and assigning the second user data packet to a second signal carrier spectrum having a second time interval between uplink transmissions with the network, the second signal carrier spectrum having the determined uplink/downlink ratio, wherein the second time interval is greater than the first time interval.

In a second aspect, a method for assigning data packet transmission in a wireless communications network is provided. The method comprises receiving a first user data packet having a first packet size, the first user data packet assigned a first quality of service class identifier, receiving a second user data packet having a second packet size, the second user data packet assigned a second quality of service class identifier, wherein the second data packet size is larger than the first data packet size, determining a network uplink/downlink ratio based on network statistics, assigning the first user data packet to a first signal carrier spectrum having a first time interval between uplink transmissions with the network, the first time interval optimized for the first quality of service class identifier, the first signal carrier spectrum having the determined uplink/downlink ratio, and assigning the second user data packet to a second signal carrier spectrum having a second time interval between uplink transmissions with the network, the second time interval optimized for the second quality of service class identifier, the second signal carrier spectrum having the determined uplink/downlink ratio.

In a third aspect, a system for assigning data packet transmission in a wireless communications network is provided. The system comprises a network controller config-ured to determine a network uplink/downlink ratio based on network statistics, receive user data packets, assign a first data packet to a first signal carrier spectrum when the first data packet is associated with a first quality of service class identifier, the first signal carrier spectrum having the determined uplink/downlink ratio and having a first time interval between uplink transmissions with the network controller, and assign a second user data packet to a second signal carrier spectrum associated with a second quality of service class identifier, the second signal carrier spectrum having the determined uplink/downlink ratio and having a second time interval between uplink transmissions with the network controller.

Throughout this disclosure, several acronyms and shorthand notations may be used to aid the understanding of certain concepts pertaining to the associated network system, services, and devices. These acronyms and shorthand notations are intended to help provide an easy methodology of communicating the ideas expressed herein and are not meant to limit the scope of the present invention. Further, various technical terms are used throughout this description. An illustrative resource that fleshes out various aspects of these terms can be found in Newton's Telecom Dictionary, $27^{th}$ Edition (2012). The following is a list of relevant acronyms:

AP Access Point
BS Base Station
DL Downlink
EnodeB Evolved Node B
LTE Long-Term Evolution
MD Mobile Device
QoS Quality of Service
RF Radio-Frequency
TCP Transmission Control Protocol
TDD Time Division Duplexing
UL Uplink The terms "network controller," "access point," and "base station" may be used interchangeably in this disclosure. The terms "mobile device," "user device," and "mobile handset" may be used interchangeably in this disclosure. The terms "signal carrier spectrum," "carrier bandwidth," "frame," and "signal bearer" may be used interchangeably in this disclosure. Although references are made to an LTE network configuration and associated assigning of data packets to signal carrier spectrums, the assigning of data packets of different sizes, session maturities, or particular qualities of service may apply to any network configuration in which data packet transfer occurs with time division duplexing.

BRIEF DESCRIPTION OF THE DRAWINGS

Illustrative embodiments of the present invention are described in detail below with reference to the attached drawing figures, wherein.

DETAILED DESCRIPTION

Figure 1:
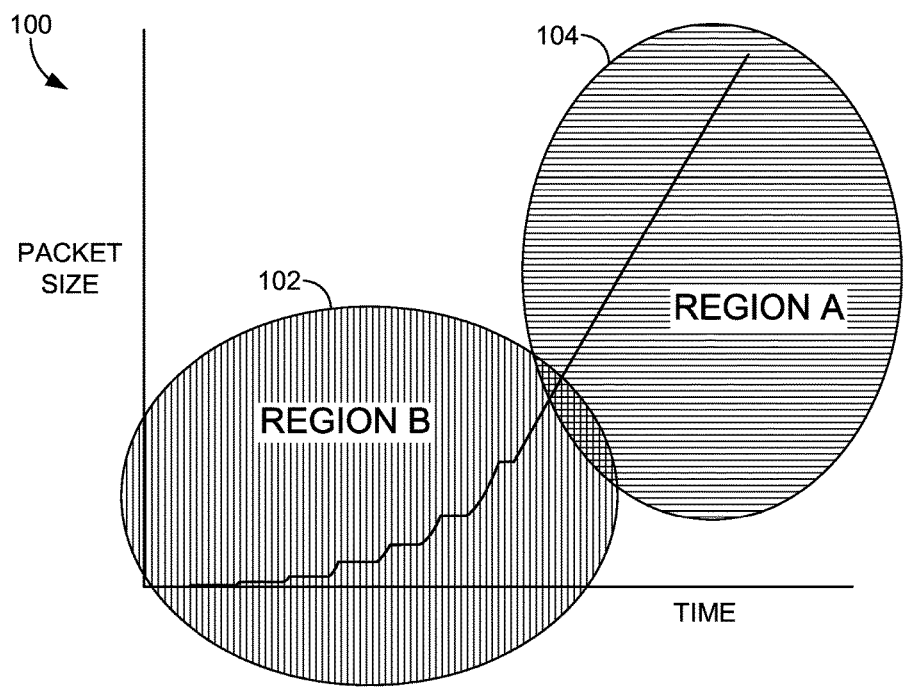
FIG. 1 depicts a TCP region graph showing TCP packet size versus session maturity, in accordance with an aspect of the present invention.

The subject matter of select embodiments of the present invention is described with specificity herein to meet statutory requirements. However, the description itself is not intended to limit the scope of the invention. The claimed subject matter might be embodied in other ways to include different features, elements, components, steps, or combinations of steps, similar to the ones described in this document, and in conjunction with other present or future technologies. Moreover, although the term "step" might be used herein to connote different elements of the methods employed, this term should not be interpreted as implying any particular order among or between various steps herein disclosed unless and except the order of individual steps is explicitly described or required.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media or devices.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprises computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Often, data packet traffic, such as TCP traffic in a TDD LTE network configuration, requires acknowledgement of all unacknowledged data packets sent to a mobile device before new data packets are transmitted to the mobile device from a network controller, such as an EnodeB. TCP sessions typically start slowly. At the beginning of the TCP session, packet sizes are generally small. Thus, acknowledgements from the mobile device, which require an uplink with the network controller, can occur more quickly in optimal situations. As time progresses, with the acknowledgement of previously unacknowledged data packets, data packet size gradually increases until a saturation point is reached, beyond which the data packets no longer increase in size. Data packets are often segmented into different TCP regions, based on maturity of the TCP session and/or the size of the data packets. These regions indicate data packets size and session maturity, for tagging purposes or identification purposes. For example, a TCP Region A may correspond to a longer, or more matured, TCP session with larger data packets, and a TCP Region B may correspond to a shorter, or less matured, TCP session with smaller data packets, and quicker acknowledgements.

A TDD carrier of TCP data traffic, such as TDD LTE, time-multiplexes resources between uplink and downlink, or in other words, uses the same frequency for uplink and downlink with separate periods of uplink and downlink (i.e., data only travels one direction at a time). Typically, since demand is much higher during downlink, downlink heavy configurations are preferred for data packet transmission from a network controller to a mobile device. These configurations typically may have a ratio of uplink to downlink of 1:9, 2:8, 3:7, etc, meaning that more time is given for downloading data packets to a mobile device than for uplinking data to the network controller (e.g., acknowledgements). This downlink heavy configuration of the TDD session is optimal for a TCP session in Region A, due to the large data packet size associated with that region, but not for a TCP session in region B, due to the small data packet size associated with that region. Additionally, at any given time, it is likely that some users are in Region A and some users are in Region B. Thus, having one fixed TDD uplink/downlink interval configuration for a network controller is not optimal for all users on a network.

In general, embodiments of the present invention include a method for assigning data packets to signal carrier spectrums, or rather, different bandwidth ranges of the same uplink/downlink frequency from a network controller using a TDD network configuration that multiplexes resources between uplink and downlink. In a first embodiment, the method comprises receiving, at a network controller, a first user data packet identified with a first packet size and a second user data packet identified with a second packet size. The data packets may be pre-designated or pre-assigned a TCP region, such as Region A and Region B, for identification by the network controller. A network uplink/downlink ratio for the TCP regions may be determined from network statistics, to provide an appropriate uplink/downlink ratio for the TCP session, and an available signal carrier spectrum, or frequency, may be divided into two or more signal carrier spectrums having the same uplink/downlink ratio, but different acknowledgement separations (i.e., continuous downlink periods), to accommodate mobile devices tagged in different regions. The first signal carrier spectrum may be associated with a first bandwidth range (e.g., 0-30 mHz) of the frequency and the second signal carrier spectrum may be associated with a second bandwidth range (e.g., 30-60 mHz) of the frequency, to provide separate signal carrier spectrums which can be configured for different acknowledgement intervals between uplink periods. In this regard, by increasing the signal strength of the original signal carrier spectrum, a greater bandwidth range can be utilized to provide segmented data packet transmission in a TDD network configuration. The network controller may identify the tagged TCP region of each data packet, and then assign each data packet to the first or the second signal carrier spectrums, depending on the region with which the data packet is associated and which signal carrier spectrum is more suited for data packets in a particular region.

In this regard, rather than assigning all data packets to a single signal carrier spectrum, or frame, which has the determined uplink/downlink ratio and a single continuous downlink period length (which may not be ideal for both Region A and Region B sessions), the available carrier spectrum may be subdivided into two or more signal carrier spectrums having the same determined uplink/downlink ratio, but different acknowledgement gaps. As a result, the network controller may assign packets having a larger packet size, such a packet tagged in Region A in a TDD LTE network configuration, to a signal carrier spectrum that utilizes longer acknowledgement periods, to allow longer continuous downlink for data transmission. The network controller may also, concurrently, assign packets having a smaller packet size, such as a packet tagged in region B in a TDD LTE network configuration, to a signal carrier spectrum that includes shorter acknowledgement periods, since longer continuous downlink periods are not required for smaller packets. This provides an optimized path for data packets of different sizes in a single TDD LTE network controller configuration, or another network configuration that utilizes TDD, or rather, time-multiplexes frequency resources for an available signal carrier spectrum.

In one embodiment, prior to receiving data packets at the network controller, a tag based QCI assigner may provide a QoS designation to some or all of the packets. In this regard, the packets that are tagged with Region A may be designated with a first class identifier, such as QCI X, for example. The packets that are tagged with Region B may be tagged with a second class identifier, such as QCI Y, for example. Using this information, a network controller, such as a base station EnodeB in an LTE network, for example, when receiving the designated packets, can determine the size of the data packet to provide an appropriate designation to the one or more signal carrier spectrums having the same uplink/downlink ratio but different acknowledgement gaps, to provide an optimal acknowledgement period for each data packet during transmission to a mobile device.

Once the network controller identifies the data packet size, such as with a tagged QCI designation, and uses the identified data packet size to determine whether to send the data packet to one of the one or more signal carrier spectrums, the network controller may allocate the data packets to a signal carrier spectrum. The operator may divide the available signal carrier spectrum into two, three, or more individual signal carrier spectrums with different frequencies, each signal carrier spectrum having the same uplink/downlink ratio and different acknowledgement gaps.

In one embodiment, the available signal carrier spectrum may be divided into two carrier spectrums, with the characteristics described above. The first signal carrier spectrum may be configured such that it provides a maximum time interval between uplink transmissions for the determined uplink/downlink ratio, for use with large data packets that require longer continuous downlink periods, such as for example, the data packets in Region A tagged with QCI X. As a result, the network controller may dynamically move all data packet traffic designated with QCI X to the first signal carrier spectrum. The second signal carrier spectrum may be configured such that it provides a minimum time interval between uplink transmissions for the determined uplink/downlink ratio. This minimized acknowledgement gap is best suited for smaller data packets, such as, for example, the data packets in Region B tagged with QCI Y. As a result, the network controller may dynamically move all data packet traffic designated with QCI Y to the second signal carrier spectrum. Optionally, a third or more additional subdivided signal carrier spectrums with the determined uplink/downlink ratio and different acknowledgement periods carried over a different bandwidth range may be user to further segment data packet traffic and provide optimal acknowledgement intervals for a TDD network.

In another embodiment, a system for assigning data packet transmission in a wireless communications network is provided. The system comprises a network controller configured to determine an uplink/downlink ratio, and even to divide an available signal carrier spectrum into two or more signal carrier spectrums having the determined uplink/downlink ratio and different acknowledgement gaps. The network controller may be configured to receive multiple data packets and/or determine the size of each data packet, either from TCP region tagging, QCI tagging, or another designation that provides an indication to the network controller that the data packet would be best allocated to a signal carrier spectrum having a longer or shorter acknowledgement gap for a given uplink/downlink ratio. The data packet size determination may be performed by the network controller, a TCP region tagger, a tag based QCI assigner, operator, or another component.

The network controller may be an EnodeB in an LTE setup, which receives input from an uplink/downlink component that determines a proper uplink/downlink ratio between the network controller and mobile device based on network statistics. An internet connection may provide the user data packets, which may be routed to a core component that features a TCP region tagger which tags the data packets with a TCP region, such as Region A or Region B, as discussed herein. Additionally, the user data packets may also interact with a tag-based QCI assigner, which may assign each data packet with a QoS identifier, such as QCI X or QCI Y, as discussed herein. The data packets may then be communicated to the network controller for allocation to the signal carrier spectrum with the proper acknowledgement gaps, based on the TCP region and/or QoS designation.

Referring now to FIG. 1, a TCP region graph 100 showing TCP packet size versus session time is shown, in accordance with an aspect of the present invention. In FIG. 1, the x-axis denotes time, and the y-axis denotes data packet size. As shown in FIG. 1, when a TCP session begins, the data packet size remains relatively small. As time progresses, the data packet size increases, moving the data packet designation out of a Region B 102 and into a Region A 104. In a TDD LTE network configuration, as the data packet transmission changes from Region B to Region A, the downlink/uplink ratio remains the same, but the optimal acknowledgement gap increases, due to the need for a longer continuous downlink to communicate data to the mobile handset.

Figure 2:
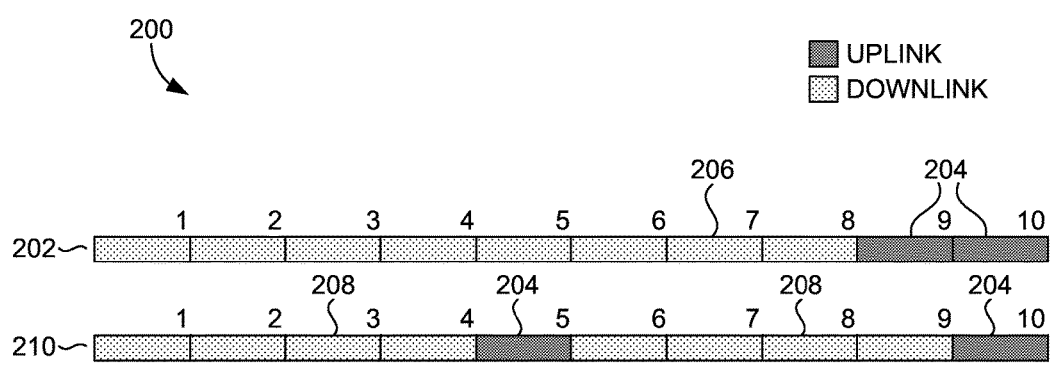
FIG. 2 depicts a graphical representation of first and second signal carrier spectrums, or frames, with a common uplink/downlink ratio and different uplink intervals, in accordance with an aspect of the present invention.

Referring now to FIG. 2, a graphical representation 200 of first and second signal carrier spectrums with a common uplink/downlink ratio and different uplink intervals (i.e. acknowledgement gaps) is shown, in accordance with an aspect of the present invention. In FIG. 2, a first signal carrier spectrum 202 provides a determined uplink/downlink ratio, which in this example is 2:8, and a maximum interval between acknowledgements, or rather, uplink periods. With the first signal carrier spectrum 202, two available frame blocks 204 assigned to uplink occur together, providing the longest possible downlink period 206. In the second signal carrier spectrum 210, the two available frame blocks assigned to uplink are maximally separated, to provide more frequent acknowledgements and minimal downlink periods 208.

Figure 3:
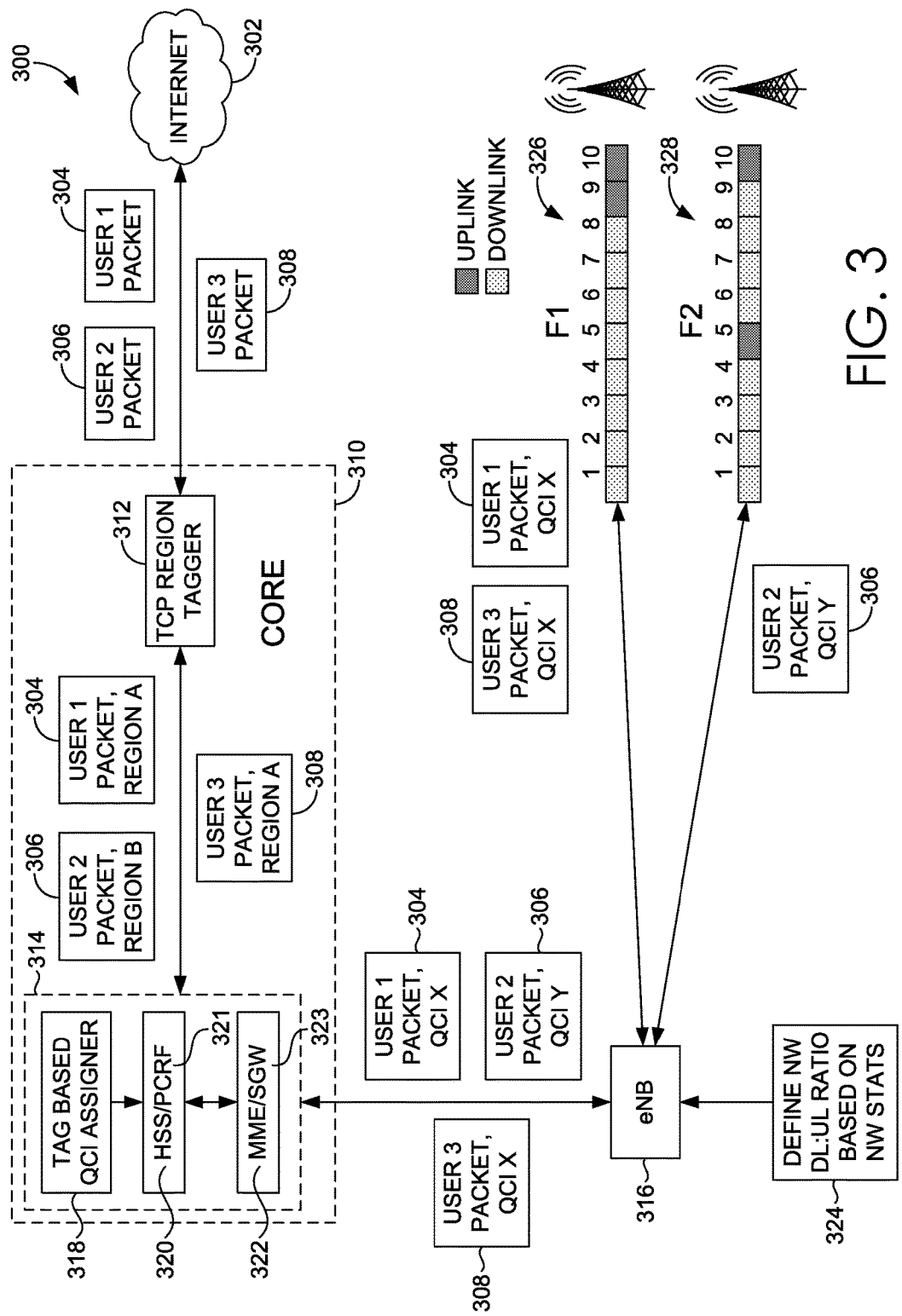
FIG. 3 depicts a diagram of an exemplary system for assigning data packet transmission in a wireless communications network, in accordance with an aspect of the present invention.

Referring now to FIG. 3, a diagram of an exemplary system 300 for assigning data packets in a wireless communications network is shown, in accordance with an aspect of the present invention. The system in FIG. 3 represents a TCP session in a TDD LTE network, which is merely one exemplary type of network with which signal carrier spectrum division and data packet assigning as described herein can be utilized. In FIG. 3, an internet connection 302 provides first, second, and third user data packets 304, 306, 308 which are received by a first core element 310. The first core element 310 includes a TCP region tagger 312 which tags the user data packets 304, 306, 308 with an associated region, such as Region A or Region B, as discussed herein, to associate the data packets with a recognizable packet size. In this example, user packet 304 is assigned Region A, user packet 306 is assigned Region B, and user packet 308 is assigned Region A. A second core element 314 includes a tag-based QCI assigner 318 and is configured to assign a QoS designation to the packets 304, 306, 308, for recognition by a network controller, which in this case is an EnodeB 316. The second core element 314 further includes interaction between the user data packets 304, 306, 308 and a home subscriber server 320 (HSS), a policy and charging rules function 321 (PCRF), a mobility management entity 322 (MME), and a serving gateway 323 (SGW).

The EnodeB 316 receives the user data packets 304, 306, 308 with the corresponding tagged QoS. In this example, user packet 304 is assigned QCI X, which corresponds to larger data packet sizes, user packet 306 is assigned QCI Y, which corresponds to smaller packets sizes, and user packet 308 is assigned QCI X. A network operator 324 is configured to determine an appropriate uplink/downlink ratio for the network based on network statistics and communicate the determined uplink downlink ratio to the EnodeB 316. The network operator 324 or EnodeB 316 may be further configured to divide the available TDD spectrum into a first signal carrier spectrum 326 and a second signal carrier spectrum 328 each having the same uplink/downlink ratio but different acknowledgement gaps (i.e., gaps between uplink periods). The first signal carrier spectrum 326 is shown having a maximum interval between uplink transmissions for the determined uplink/downlink ratio, to best accommodate TCP data packets assigned to Region A and tagged with QCI X. The second signal carrier spectrum 328 is shown having a minimum interval between uplink transmissions for the determined uplink/downlink ratio, to accommodate TCP data packets assigned to Region B and tagged with QCI Y. In this regard, the EnodeB 316 is configured to dynamically move TCP data packet traffic to individual signal carrier spectrums 326 or 328 which are best optimized for the data packet size and/or region and/or assigned QoS during real time TDD TCP sessions.

Figure 4:
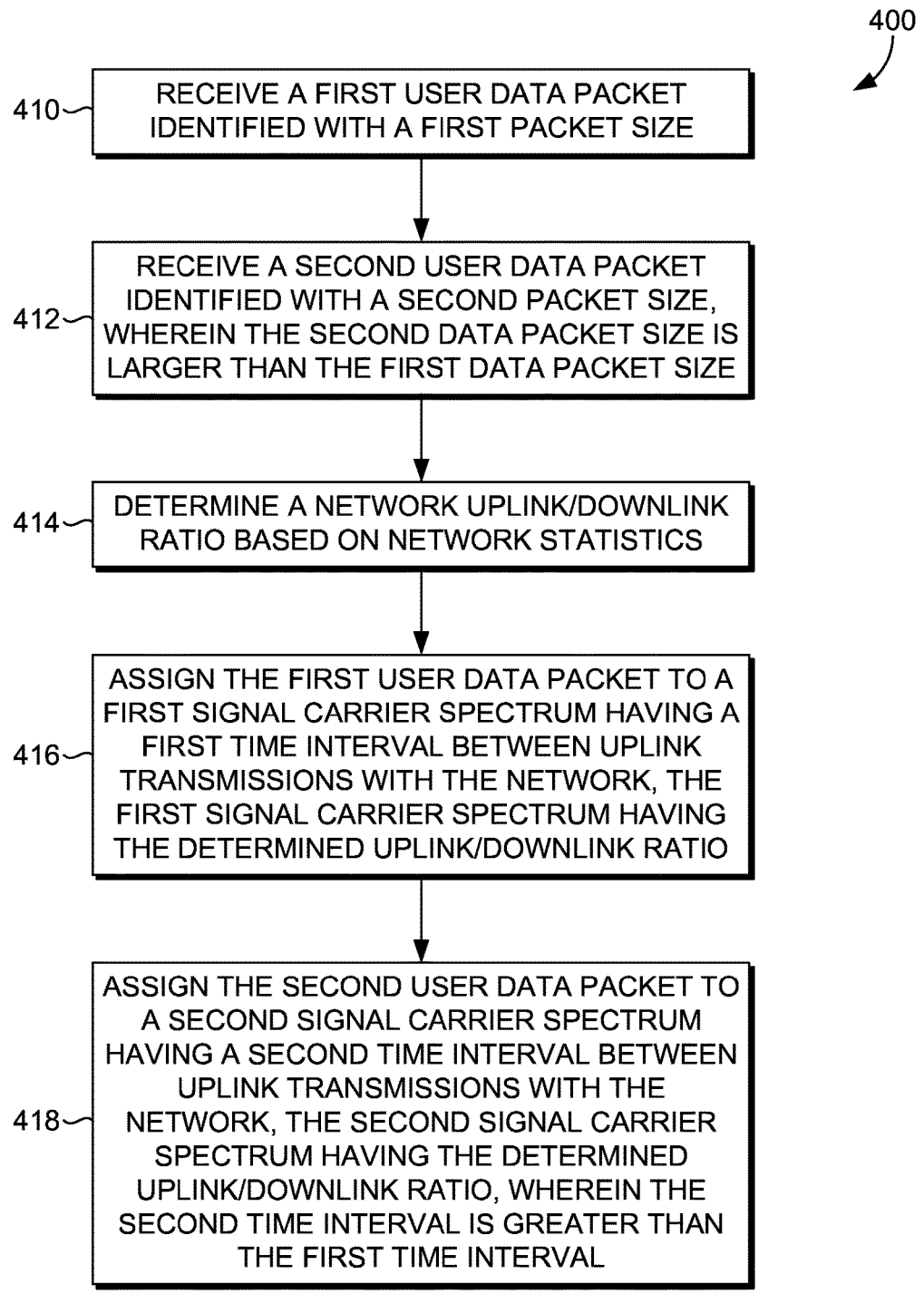
FIG. 4 depicts a flowchart of a first exemplary method for assigning data packet transmission in a wireless communications network, in accordance with an aspect of the present invention.

Referring now to FIG. 4, a first exemplary method 400 for assigning data packet transmission in a wireless communications network is provided, in accordance with an aspect of the present invention. At a block 410, a first data packet identified with a first packet size is received. At a block 412, a second user data packet identified with a second packet size is received, the second data packet size being larger than the first data packet size. At a block 414, a network uplink/downlink ratio is determined based on network statistics. At a block 416, the first user data packet is assigned to a first signal carrier spectrum having a first time interval between uplink transmissions with the network, the first signal carrier spectrum having the determined uplink/downlink ratio, and the second user data packet is assigned to a second signal carrier spectrum having a second time interval between uplink transmission with the network, the second signal carrier spectrum having the determined uplink/downlink ratio, where the first time interval is greater than the second time interval.

Figure 5:
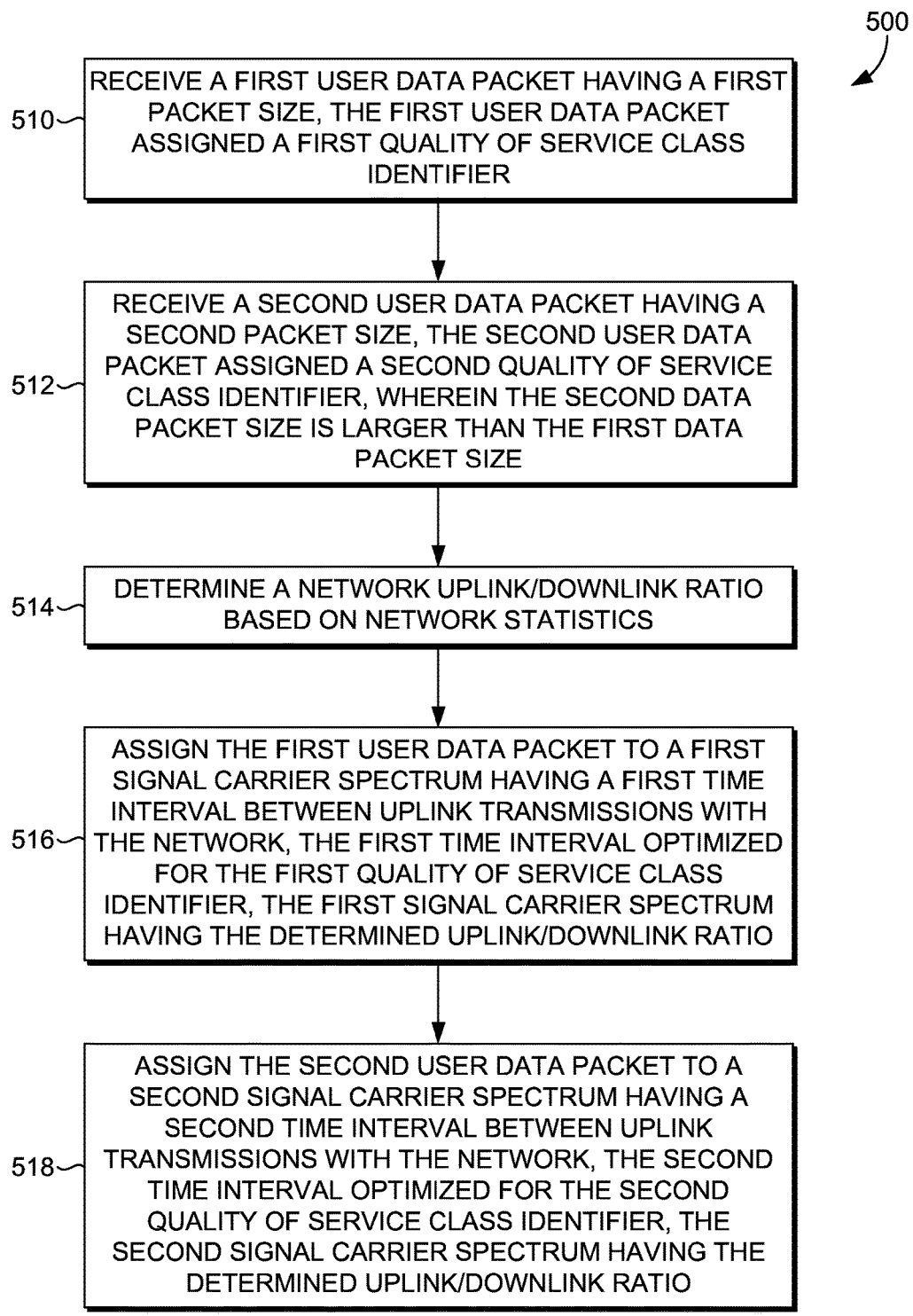
FIG. 5 depicts a flowchart of a second exemplary method for assigning data packet transmission in a wireless communications network, in accordance with an aspect of the present invention.

Referring now to FIG. 5, a second exemplary method 500 for assigning data packet transmission in a wireless communications network is provided, in accordance with an aspect of the present invention. At a block 510, a first user data packet having a first packet size is received, the first user data packet assigned a first quality of service class identifier. At a block 512, a second user data packet having a second packet size is received, the second user data packet assigned a second quality of service class identifier, where the second data packet size is larger than the first data packet size. At a block 514, a network uplink/downlink ratio is determined based on network statistics. At a block 516, the first user data packet is assigned to a first signal carrier spectrum having a first time interval between uplink transmissions with the network, the first time interval optimized for the first quality of service class identifier, the first signal carrier spectrum having the determined uplink/downlink ratio. At a block 510, the second user data packet is assigned to a second signal carrier spectrum having a second time interval between uplink transmissions with the network, the second time interval optimized for the second quality of service class identifier, the second signal carrier spectrum having the determined uplink/downlink ratio.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated as within the scope of the claims.

What is claimed is:

1. A system for transmitting data packets in a wireless communications network, the system comprising:
   a TCP region tagger configured to tag a first data packet with a first TCP region and a second data packet with a second TCP region based on a size of the respective first and second data packets; and
   a network controller configured to:
   assign the first data packet to a first signal carrier spectrum having a first time interval between uplink transmissions and an established network uplink/downlink ratio, wherein the first data packet is assigned to the first signal carrier spectrum based on it having more frequent uplinks with the network based on the tagged first TCP region indicating a session maturity and data packet size that is below a threshold, and
   assign the second data packet to a second signal carrier spectrum having a second time interval between uplink transmissions and the established network uplink/downlink ratio, wherein the second data packet is assigned to the second signal carrier spectrum based on it having less frequent uplinks with the network based on the tagged second TCP region indicating a session maturity and data packet size that is above the threshold.

2. The system of claim 1, wherein the network controller is an EnodeB associated with a base station in an LTE network.

3. The system of claim 1, wherein the first and second data packets have an associated QCI based on their tagged TCP region.

4. The system of claim 1, wherein the first signal carrier spectrum is a first bandwidth range of a carrier frequency and the second signal carrier spectrum is a second bandwidth range of the carrier frequency.

5. The system of claim 1, further comprising a tag-based QCI assigner for assigning first and second quality of service class identifiers to the respective first and second data packets.

6. The system of claim 1, further comprising a network operator configured to determine the network uplink/downlink ratio and communicate the network uplink/downlink ratio to the network controller.

7. The system of claim 6, wherein the network operator is configured to divide an available time division duplexing (TDD) carrier spectrum into the first signal carrier spectrum and the second signal carrier spectrum.

8. The system of claim 1, further comprising a home subscriber server in communication with the network controller.

9. The system of claim 1, further comprising a mobile management entity in communication with the network controller.

10. The system of claim 1, further comprising a serving gateway in communication with the network controller.

11. The system of claim 1, wherein the established uplink/downlink ratio is 2:8.

12. A method for assigning data packet transmission in a wireless communications network, the method comprising:
receiving, by a core element, a first data packet;
identifying, by the core element, that the first data packet has a first data packet size;
receiving, by the core element, a second data packet;
identifying, by the core element, that the second data packet has a second data packet size, wherein the second data packet size is larger than the first data packet size;
determining, by the core element, a network uplink/downlink ratio;
assigning, by a network controller, the first data packet to a first signal carrier spectrum having a first time interval between uplink transmissions with the network, the first signal carrier spectrum having the determined uplink/downlink ratio; and
assigning, by the network controller, the second data packet to a second signal carrier spectrum having a second time interval between uplink transmissions with the network, the second signal carrier spectrum having the determined uplink/downlink ratio,
wherein the second time interval is greater than the first time interval.

13. The method of claim 12, further comprising tagging the first and second data packets based on a TCP region with which the first and second data packets are associated, respectively.

14. The method of claim 12, wherein the size of the second data packet is larger due to session maturity.

15. The method of claim 12, wherein the first and second data packets are associated with respective first and second quality of service class identifiers.

16. The method of claim 15, wherein the first quality of service class identifier associated with the first data packet indicates that the first data packet should be transferred to the first signal carrier spectrum.

17. The method of claim 15, wherein the second quality of service class identifier associated with the second data packet indicates that the second data packet should be transferred to the second signal carrier spectrum.

18. The method of claim 12, wherein the determined uplink/downlink ratio is 2:8.

19. The method of claim 12, wherein the second time interval is twice the length of the first time interval.

20. The method of claim 12, further comprising receiving a third data packet identified with a third packet size, and assigning the third data packet to a third signal carrier spectrum having a third time interval between uplink transmissions with the network, the third signal carrier spectrum having the determined uplink/downlink ratio.

* * * * *